United States Patent
Johnson et al.

(10) Patent No.: US 10,928,260 B2
(45) Date of Patent: Feb. 23, 2021

(54) IMPACT FORCE GAUGE WITH WIRELESS NOTIFICATIONS

(71) Applicant: Toshiba Global Commerce Solutions Holdings Corporation, Tokyo (JP)

(72) Inventors: Brad Matthew Johnson, Raleigh, NC (US); Joshua Stephen Fatcheric, Raleigh, NC (US); Ashley Lanier Trimpey, Mebane, NC (US); Marcus A. McDowell, Durham, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 152 days.

(21) Appl. No.: 16/288,846

(22) Filed: Feb. 28, 2019

(65) Prior Publication Data

US 2020/0278266 A1    Sep. 3, 2020

(51) Int. Cl.
*G01L 5/00* (2006.01)
*B65D 79/02* (2006.01)

(52) U.S. Cl.
CPC ............ *G01L 5/0052* (2013.01); *B65D 79/02* (2013.01)

(58) Field of Classification Search
CPC .............................. G01L 5/0052; B65D 79/02
See application file for complete search history.

(56) References Cited

U.S. PATENT DOCUMENTS

| | | | |
|---|---|---|---|
| 4,361,106 A | 11/1982 | Eklof | |
| 5,481,245 A | 1/1996 | Moldavsky | |
| 5,936,523 A | 8/1999 | West | |
| 6,848,389 B1* | 2/2005 | Elsasser | G01L 5/0052 |
| | | | 116/203 |
| 8,074,489 B2 | 12/2011 | Ishikawa et al. | |
| 8,234,993 B2* | 8/2012 | Naruishi | G01L 5/008 |
| | | | 116/203 |
| 9,291,511 B2 | 3/2016 | Gibson et al. | |
| 9,965,939 B2 | 5/2018 | Nygren et al. | |
| 10,048,102 B2 | 8/2018 | Kadaba | |
| 2002/0082787 A1 | 6/2002 | Woodworth et al. | |
| 2006/0168644 A1 | 7/2006 | Richter et al. | |

(Continued)

FOREIGN PATENT DOCUMENTS

WO        2001040808 A1    6/2001

OTHER PUBLICATIONS

Claire Swedberg, "DropTag Knows When a Package Has Been Handled With Care," RFID Journal, Feb. 12, 2013.

(Continued)

*Primary Examiner* — David Z Huang
(74) *Attorney, Agent, or Firm* — Patterson + Sheridan, LLP

(57) ABSTRACT

Embodiments provide for an impact force gauge that includes a track and a shell that is designed to flex from a first state to a second state when a force exceeding a predetermined threshold is applied along a given axis and that is designed to return to the first state when the force falls below the predetermined threshold along the given axis. A roller is located in the shell and has a diameter such the roller is allowed or blocked from moving to different locations in the impact force gauge based on the force applied thereto. Based on the presence or absence of the roller along different portions of the track, the force gauge wirelessly transmits an indication of whether the force gauge has been exposed to a force that exceeds the predetermined threshold.

20 Claims, 12 Drawing Sheets

(56) References Cited

U.S. PATENT DOCUMENTS

| | | | |
|---|---|---|---|
| 2007/0056369 A1 | 3/2007 | Griffin et al. | |
| 2010/0050733 A1* | 3/2010 | Naruishi | G01C 9/10 |
| | | | 73/12.06 |
| 2015/0254600 A1 | 9/2015 | Murthy et al. | |
| 2015/0382085 A1 | 12/2015 | Lawrie-Fussey et al. | |

OTHER PUBLICATIONS

Mateusz Malinowski, "A Low-Cost MicroPower Sensor Node Exploiting Quasi-Passive Wakeup for Adaptive Asynchronous Monitoring of Exceptional Events," MIT Media Lab, Jun. 11, 2007.

* cited by examiner

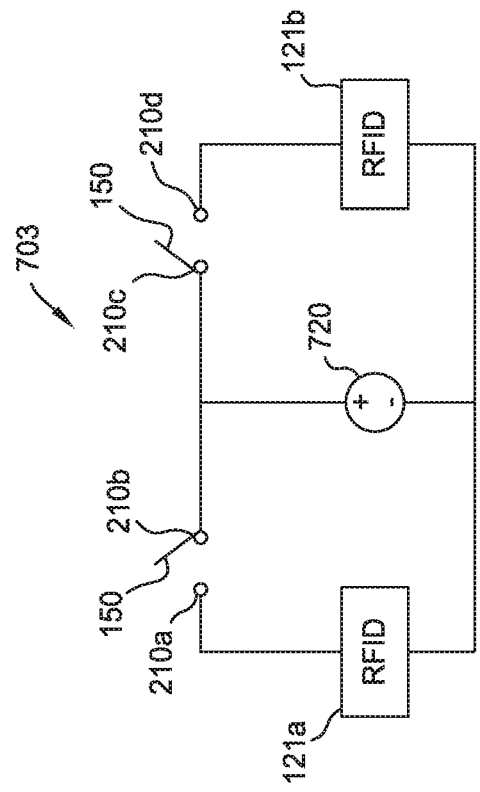
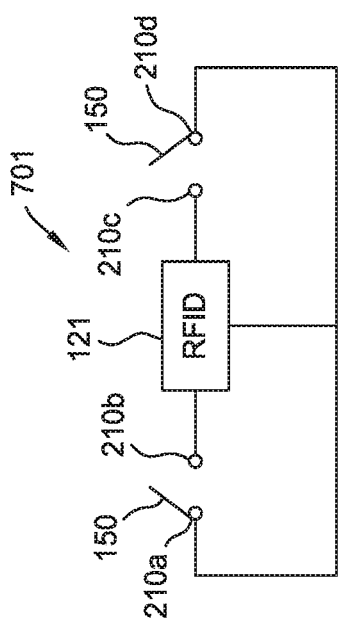

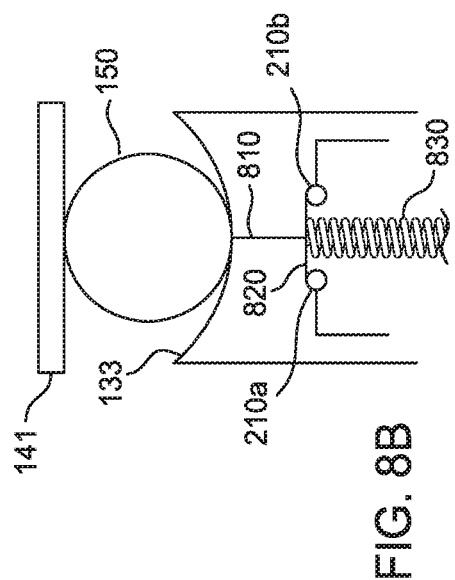
FIG. 8A
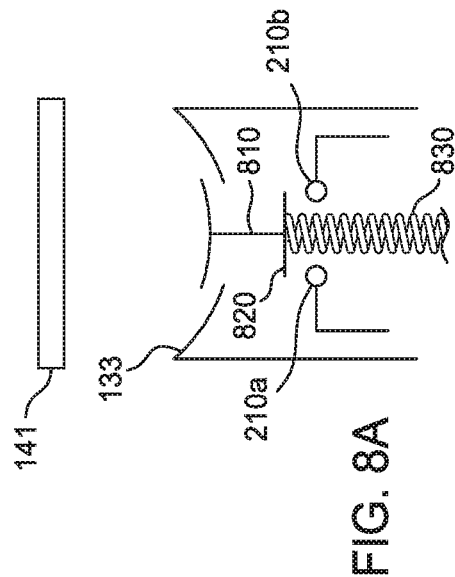
FIG. 8B
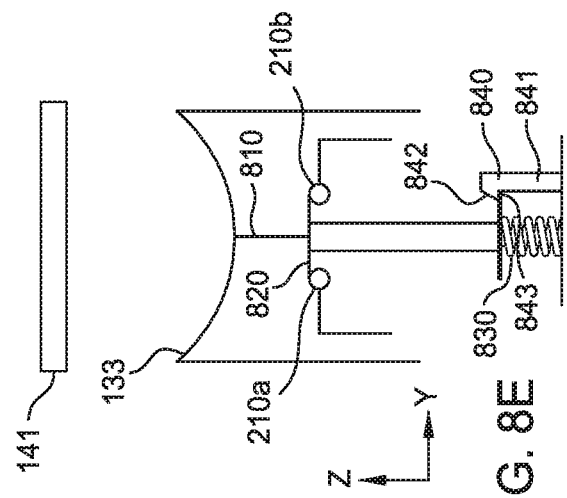
FIG. 8C
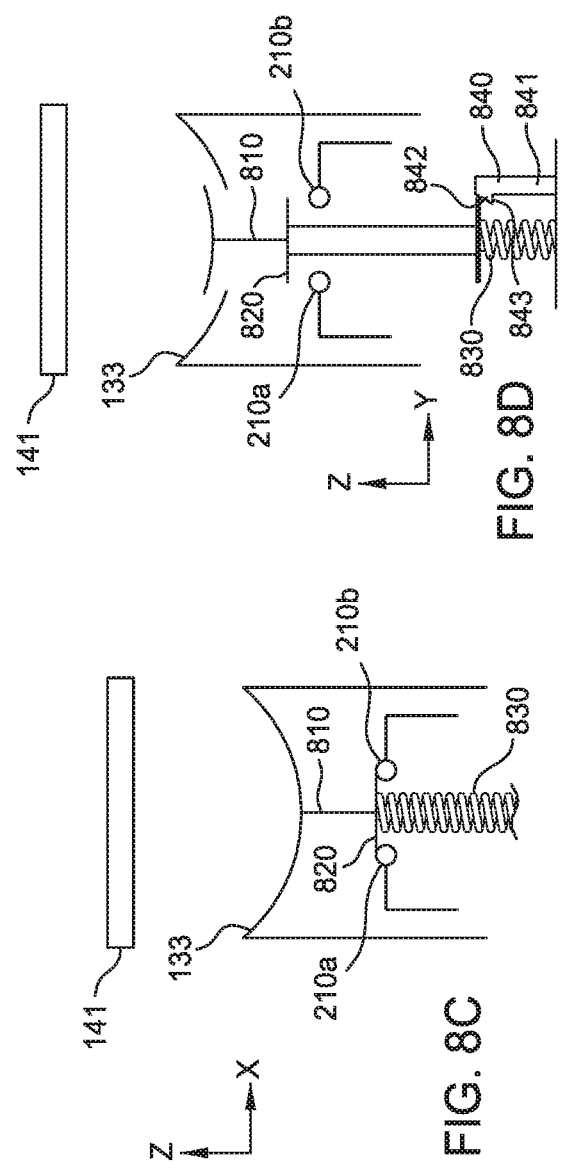
FIG. 8D
FIG. 8E

IMPACT FORCE GAUGE WITH WIRELESS NOTIFICATIONS

BACKGROUND

Various real-world objects have various resistances to shocks, impacts, pressures, and other forces. The owners of these objects (and third party handlers) may desire to monitor the objects to determine whether excessive forces have been applied to the object. For example, a first person may wish to monitor a package in transit through a factory, in a shipping facility, on a flight, while in a warehouse, etc., to assure a second person that the package has not been subjected to excessive forces of various types.

SUMMARY

According to one embodiment of the present invention, an impact force gauge is provided that comprises: a base, including a Radio Frequency Identifier (RFID) antenna; a roller, having a diameter and an electrically conductive surface; a track mounted to the base along an axis, the track including: a first detent located at a first height from the base, the first detent including a first pair of electrical contacts configured to close a first circuit that includes the RFID antenna across the electrically conductive surface of the roller when the roller is captured in the first detent; a second detent located at a second height from the base, the second detent including a second pair of electrical contacts configured to close a second circuit that includes the RFID antenna across the electrically conductive surface of the roller when the roller is captured in the second detent; and a trough connected to the first detent via a first ramp and to the second detent via a second ramp, wherein the trough runs from the first height to a third height and from the third height to the second height between the first detent and the second detent, wherein the third height is less than the first height and the second height; and a shell flexibly mounted to the base around the track and configured to capture the roller along the track, the shell including a cap that runs along the track in a plane parallel to the base, wherein the cap is located at a first vertical distance from the first detent and a second vertical distance from the second detent, wherein the first vertical distance and the second vertical distance are less than the diameter while the base is subjected to forces along the axis less than a predefined force threshold and are greater than the diameter while the base is subject to forces along the axis greater than the predefined force threshold.

According to one embodiment of the present invention, an impact force gauge is provided that comprises: a roller; a track including: a trough arranged along an axis of the track; and a detent elevated at a first end of the track; and a flexible shell configured to retain the roller on the track, wherein, in response to a force applied along the axis exceeding a threshold force, a relative distance between the shell and the track increases to be greater than a diameter of the roller.

According to one embodiment of the present invention, an impact force gauge is provided that comprises: a shell, configured to flex from a first state to a second state when a force exceeding a predetermined threshold is applied along a given axis and configured to return to the first state when the force falls below the predetermined threshold along the given axis; a track surrounded by the shell and running on the given axis, the track including: a first portion located a first distance from the shell; and a second portion located a second distance, different from the first distance, from the shell; and a roller located between the track and the shell, wherein, in the first state, the first distance is not greater than a diameter of the roller; and wherein, in the second state, the first distance is greater than the diameter of the roller.

BRIEF DESCRIPTION OF THE SEVERAL VIEWS OF THE DRAWINGS

FIGS. 7A-7C illustrate circuits formed in a force gauge, according to aspects of the present disclosure.

FIGS. 8A-8E illustrate operation of internal tamper resistant electrical contacts, according to aspects of the present disclosure.

DETAILED DESCRIPTION

Figure 1A:
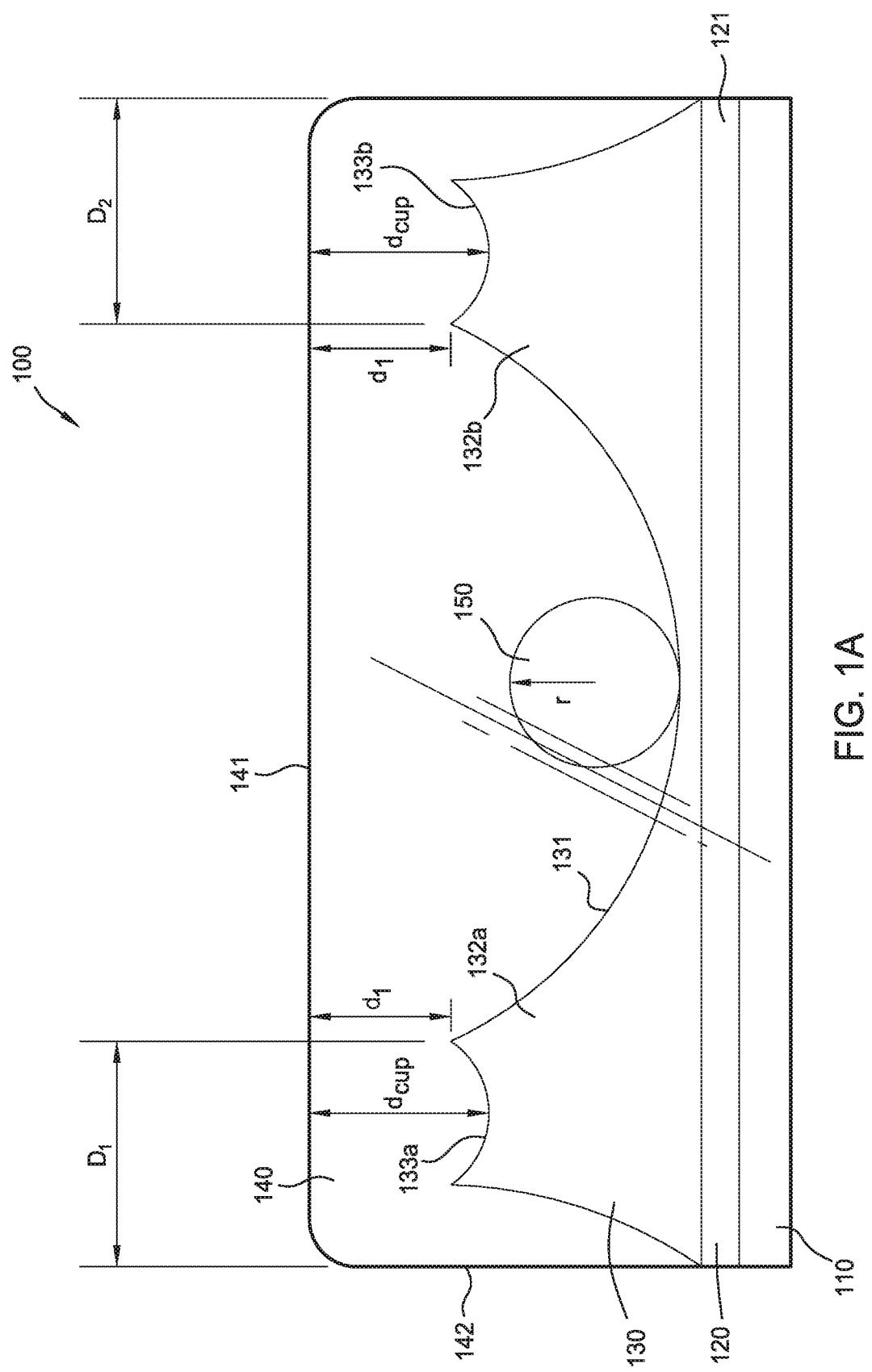
FIGS. 1A-1C illustrate a side view of a force gauge in various states, according to aspects of the present disclosure.

The present disclosure provides impact force gauges to visually and electronically indicate whether the force gauge has experienced forces above a predefined magnitude (e.g., as an indication of whether an object to which the force gauge is mounted has experienced forces above that predefined magnitude).

Impact force gauges provide visual indications of whether an object has been subjected to a drop, collision, or other impact that exceeded a predefined strength. Impact force gauges may be used in shipping, aeronautical, automotive, and manufacturing settings (among others) to ensure that an object has been handled with a requisite level of care. Forces applied to the impact force gauges may affect different movements in a casing and an object captured inside the casing when the force vector in a given direction is of sufficient magnitude. The relocation of the captured object (s) from a first location in the impact force gauge to a second location in the impact force gauge provides a visually observable indication that the force gauge has previously been subjected to a force in a given direction that exceeded a predefined magnitude.

In various aspects, the impact force gauge includes a track and a shell than run along a given axis. The track and shell allow a roller (e.g., a ball or cylinder) to move along the given axis to various portions of the track. The track varies in height over the length of the track to define at least one detent that is shaped to capture and/or retain the roller as the force gauge experiences various level of force applied along the given axis. The shell flexes in response to the forces applied along the given axis, expanding or contracting the distance between the shell and the track at various positions along the force gauge, which may prevent or allow the roller to travel to different portions of the track that are separated according to the various heights of the track and the diameter of the roller. The roller, when captured in a particular portion of the track, provides a visual indication of whether the force gauge has been exposed to a force sufficient to move the roller into that position from another position. For example, at a given position on the track where the distance between the shell and the track is x millimeters (mm) and the diameter of the roller is 2x mm, the position of the roller relative to the given position (e.g., on a first side or on a second side of the given position) can visually indicate whether the shell has been flexed by a force sufficient to expand the distance at the given position to be at least 2x mm.

Additionally, a Radio Frequency Identifier (RFID) antenna is in electrical contact with various portions of the track, and the roller may open or close various circuits via those electrical contacts to affect how or whether the RFID antenna reacts to an RFID scanner. For example, the roller may provide an electronic indication that the force gauge has experienced forces above a predefined magnitude by moving to a portion of the track where the roller completes/closes a circuit in the RFID antenna to cause the RFID antenna to produce a signal in the presence of an RFID scanner. In another example, the roller may provide an electronic indication that the force gauge has experienced forces above a predefined magnitude by breaking/opening a circuit by leaving a portion of the track that includes the electrical contacts or by moving to a portion of the track that includes electrical contacts for a shunt that prevents the RFID antenna from producing a signal in the presence of an RFID scanner.

Figure 1B:
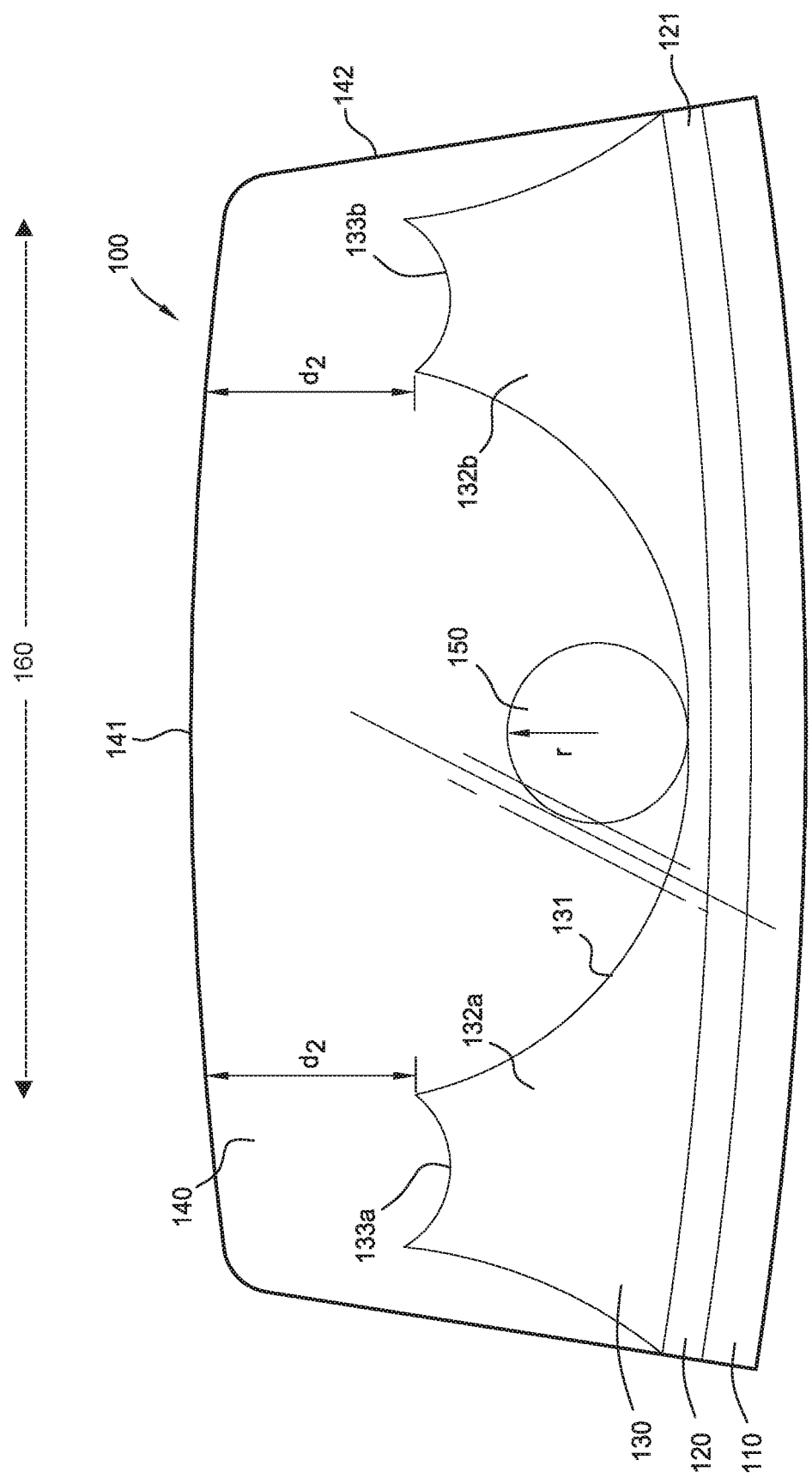
Figure 1C:
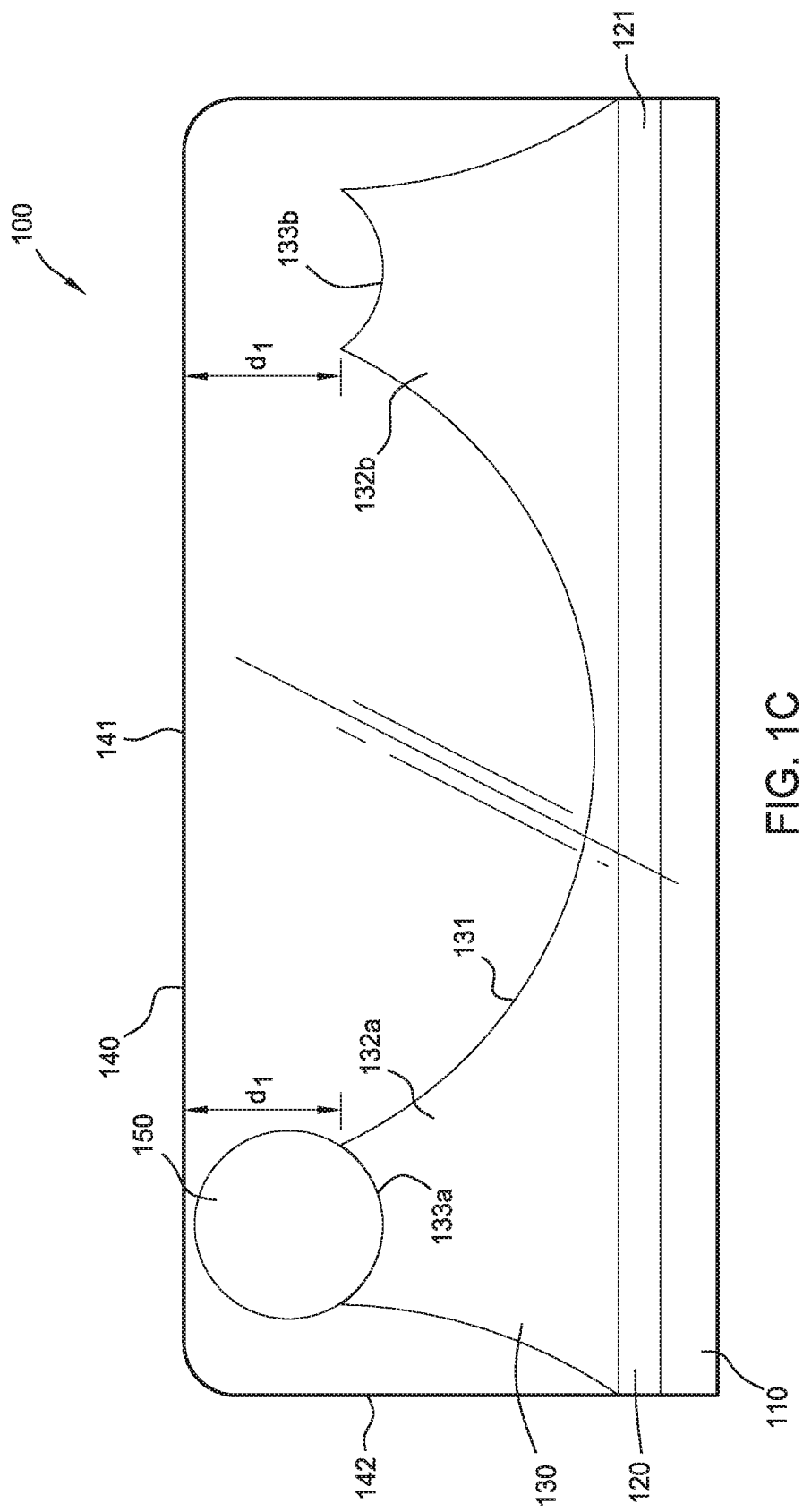

Turning now to FIGS. 1A-1C, a force gauge 100 is illustrated, in profile, in various states. The force gauge 100 includes a base 120 that includes a Radio Frequency Identifier (RFID) antenna 121, and an adhesive layer 110 to mount the force gauge 100 to various objects. On an opposite face of the base 120 to which the adhesive layer 110 is mounted, the force gauge 100 includes a track 130 and a shell 140, which capture a roller 150 therebetween. The axis on which the length of the track 130 runs defines the axis on which the force gauge 100 measures impact forces.

In various aspects, the adhesive layer 110 includes a glue to permanently or temporarily affix the force gauge 100 to an object, and the adhesive layer 110 may be exposed by removing a protective barrier (e.g., a film, waxed paper), or activated by heat, light, or the presence of a secondary adhesive. In various aspects, the adhesive layer 110 includes one or more magnets to temporarily affix the force gauge 100 to a ferromagnetic object without using glues. In various aspects, the adhesive layer 110 may be sized/shaped to hold the force gauge 100 in place in conjunction with physical interlocks (e.g., pockets) defined on the object that the force gauge 100 is temporarily or permanently affixed to, and may omit glues and/or magnets.

The RFID antenna 121 included in the base 120 is designed to produce an identifier signal that is associated with the force gauge 100. In some aspects, the RFID antenna 121 is an active device that includes a power source to produce the signal and transmit the signal for reception by RFID scanners in range of the force gauge 100. In other aspects, the RFID antenna 121 is a passive device that energizes and transmits the signal when in the presence of an electromagnetic field produced by an RFID scanner. In various aspects, the RFID antenna 121 is included in a circuit that is opened or closed based on the presence of the roller 150 in a particular location of the track 130, which makes or breaks contact as a switch within the circuitry of the RFID antenna 111, which is discussed in greater detail in regard to FIGS. 7A and 7B herein.

The track 130 and the shell 140 define a pathway in which the roller 150 moves in response to various forces applied to the force gauge 100. The track 130 varies in distance from the shell 140 along the length of the track 130 to create bottlenecks that prevent the roller 150 from freely moving to different portions of the force gauge 100 unless a force of sufficient magnitude is acting on the force gauge 100. The bottlenecks are defined such that the diameter of the roller 150 is less than the distance d between the track 130 and the shell 140 for a particular length of the force gauge 100.

In some aspects, the track 130 varies in height from the base 120 at various positions along the length of the track 130, and a cap 141 of the shell 140 maintains a constant height from the base 120 along the length of the track 130 to define bottlenecks or regions with greater or lesser distances between the track 130 and the shell 140. In other aspects, the track 130 is defined at a constant height relative to the base 120, and the cap 141 of the shell 140 varies in height relative to the base 120. In further aspects, the track 130 and the cap 141 vary in height relative to the base 120 across the length of the track 130 to create various bottlenecks along the track 130.

The shell 140 is made from a clear or translucent plastic, which allows for visual inspection for where the roller 150 is located along the track 130. Perimeter walls 142 extend upward from the base 120 and support a cap 141 that is included in a plane parallel to the base 120. The material of the shell 140 flexes at a different rate that the material of the track 130 such that when the force gauge 100 is deformed by a force acting on the axis of the force gauge 100, the distance d of a bottleneck defined between the track 130 and the shell 140 increases to be at least the diameter of the roller 150. The shell 140 may vary in flexibility based on a material (and thickness thereof) chosen for the shell 140 or a distance D of a perimeter wall of the shell 140 from the bottleneck to affect how far the shell 140 flexes under a given force and in which direction the shell 140 flexes relative to the base 120 (i.e., inward or outward). In various aspects, the thickness of the cap 141 may decrease at various locations to define flex points in the cap 141, where the cap 141 flexes to a greater degree than in location with a greater thickness.

The track 130 illustrated in FIGS. 1A-1C includes several distinct portions, including a trough 131 that extends via a first ramp 132a (generally, ramp 132) to a first detent 133a (generally, detent 133) and via a second ramp 132b to a second detent 133b. As illustrated, the detents 133 are located at respective ends of the track 130 (and the trough 131 is located between the two detents 133), but in other aspects a force gauge 100 may include detents 133 and troughs 131 in different numbers and in other arrangements (See e.g., FIGS. 4A-4J). The detents 133 include a cup matched to the layout of the roller 150 to capture the roller in the detent 133, and a lip that forms the bottleneck between the track 130 and the shell 140, which secures/releases a roller 150 held in the detent 133 or prevents/allows a roller 150 held in the trough 131 from entering the detent 133 based on the forces acting on the force gauge 100.

The position of the roller 150 on the track 130 (i.e., in a particular detent 133a/133b or in the trough 131) indicates whether the force gauge 100 has been previously subjected to a force vector of a sufficient magnitude along the length of the force gauge 100 to move the roller from an initial position. In some aspects, the force gauge 100 is initially set up to include the roller 150 in a particular detent 133, and the presence of the roller 150 in the trough 131 (or another detent 133) indicates that the force gauge 100 has experienced a force that exceeds a predefined threshold. In other aspects, the force gauge 100 is initially set up to include the roller 150 in the trough 131, and the presence of the roller 150 in a detent 133 indicates that the force gauge 100 has experienced a force that exceeds a predefined threshold. As will be appreciated, a force threshold includes a magnitude component (which a designer may tune the force gauge 100 for based on the relative flex rates of the track 130 and the shell 140) and a direction component (which an installer may tune the force gauge 100 for based on the alignment of the track 130).

FIGS. 1A and 1C illustrate two configurations for a force gauge 100 in a first state, in which the lips of the detents 133 are held at a first distance $d_1$ from the cap 141. FIG. 1A illustrates a configuration in which a roller 150 is located in the trough 131, and FIG. 1B illustrates a configuration in which the roller 150 captured in a detent 133. In various aspects, FIG. 1A corresponds to an initial configuration of the force gauge 100, and FIG. 1B corresponds to an impacted configuration of the force gauge 100 (in which the roller 150 is moved from the trough 131 into a detent 133 by an impact). In other aspects, FIG. 1C corresponds to the initial configuration and FIG. 1A corresponds to an impacted configuration (in which a roller 150 is dislodged from a detent 133 into the trough 131 by an impact). The first state is a resting state for the force gauge 100 in which the forces acting along the length of the force gauge 100 are below a predefined threshold in magnitude. The illustrated roller 150 has a diameter 2r (based on the radius r) that is greater than the first distance $d_1$, which prevents the roller 150 from entering the detents 133 from the trough 131 (per FIG. 1A) or prevents the roller 150 from being dislodged from a detent 133 into the trough 131 (per FIG. 1C).

FIG. 1B illustrates the force gauge 100 in a second state, in which the force gauge 100 is experiencing a force along the measurement axis 160 sufficient to increase the distance between the lips of the detents 133 and the cap 141 to a second distance $d_2$. The second distance $d_2$ is equal to or greater than the diameter 2r of the roller 150, which allows the roller 150 to travel in either direction along the length of the force gauge 100 and enter one of the detents 133 from the trough 131 or be dislodged from a detent 133 into the trough 131. The force gauge 100 returns to the first state from the second state as the impact force subsides; capturing the roller 150 in a new location to visually indicate that the force gauge 100 has experienced a force exceeding the predefined threshold.

Figure 2A:
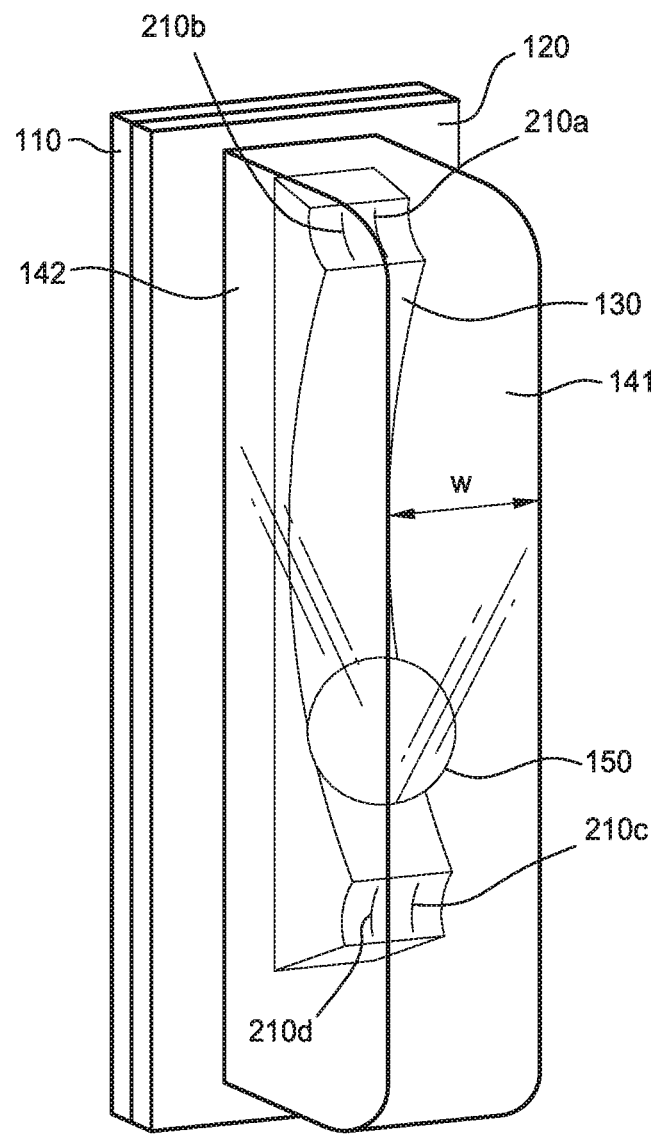
FIG. 2A-2C illustrate an isometric view of a force gauge, according to aspects of the present disclosure.
Figure 2B:
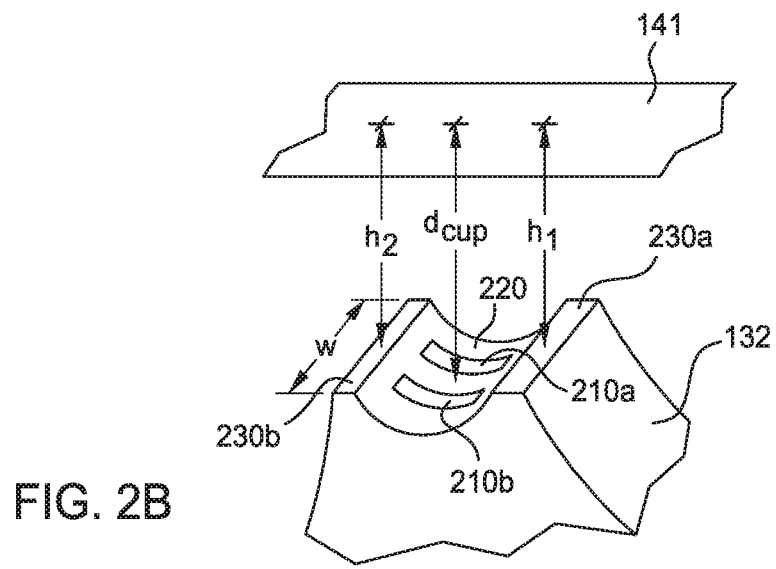
Figure 2C:
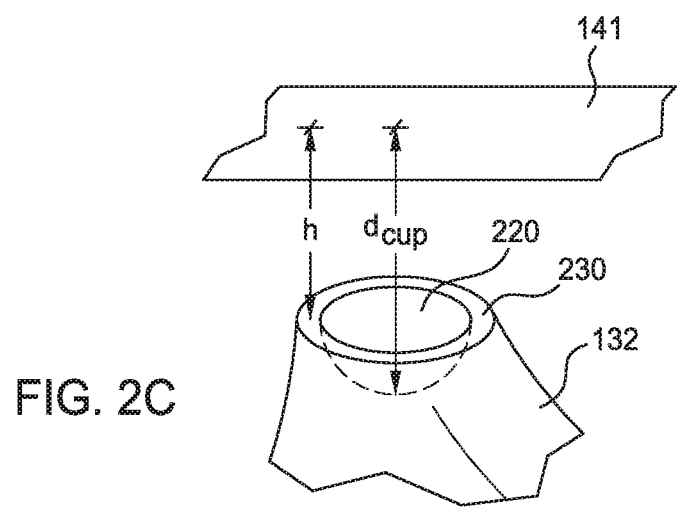

FIGS. 2A-2C illustrate isometric views of force gauges 100, highlighting the detents 133. The detents 133 may include a pair of electrical contacts 210 within a cup 220 defined by one or more lips 230. In some aspects, a force gauge 100 includes a first detent 133a that includes a first pair of electrical contacts 210 and a second detent 133b that includes a second pair of electrical contacts 210. In some aspects, a force gauge 100 includes a first detent 133a that includes a first pair of electrical contacts 210 and a second detent 133b that does not include electrical contacts 210. As illustrated in FIGS. 2A-2C, each pair of electrical contacts 210 is shaped and arranged in the cup 220 so that the roller 150 (when in the cup 220) forms an electrical switch with a pair of electrical contacts 210. In some aspects, discussed in greater detail in regard to FIGS. 7A and 7B, the presence of the roller 150 completes a circuit to provide power to an active RFID antenna 121, shunts power away from an RFID antenna 121, completes a wavepath for a passive RFID antenna 121, or disrupts a wavepath of an RFID antenna 121.

The cups 220 of the detents 133 are dimensioned based on the size and the shape of the roller 150 chosen for use in the force gauge 100. The cups 220 illustrated in FIG. 2A and FIG. 2B have cylindrical cross sections, which may be used with various types of rollers 150, although other cross section shapes, such as the hemispherical cross section illustrated in FIG. 2C, may be used in other aspects based on the cross section of the roller 150 (e.g., spherical, cylindrical, ovoid, irregular). In some aspects, the width w of the detent 133 is matched to the width of the roller 150 to thereby capture the roller 150 along the axis of force measurement. In other aspects, the width of the detent 133 is greater than the width of the roller 150.

The distance $d_{cup}$ from the bottom of the cup of the detent 133 to the cap 141 of the shell 140 when the force gauge 100 is in a resting state is based on the diameter 2r of the roller 150. In some aspects, the distance $d_{cup}$ is less than the diameter 2r (e.g., $d_{cup}=2r-n$ %, n∈(0.01 to 10)), to thereby cause the cap 141 to press the roller 150 into the recess of the cup 220 and ensure an electrical connection across the electrical contacts 210 via the roller 150 or engagement of a switch mechanism. In other aspects, the distance $d_{cup}$ is greater than or equal to the diameter 2r, and the electrical contacts 210 and the force gauge 100 are arranged such that gravity holds the roller 150 in contact with the electrical contacts 210, or the detent 133 includes a switch mechanism that once engaged by the roller 150, maintains an electrical connection across the electrical contacts 210.

The lip 230 defines an edge of the cup 220, and at least a portion of at least one lip 230 is connected to the ramp 132 of the track 130. The resting distance d between the lip 230 and the cap 141 of the shell 140 may be constant, or may be variable across the width of the detent 133.

In FIGS. 2A and 2B, the cup 220 is defined from a first lip 230a to a second lip 230b as a cylindrical cutout in the track 130. FIG. 2A illustrates a force gauge 100 with a detent 133 having a cup 220 with a cylindrical cross section that includes a first electrical contact 210a (generally, electrical contact 210) and a second electrical contact 210b that for a pair of electrical contacts. FIG. 2B illustrates a force gauge 100 with a detent 133 having a cup 220 with a cylindrical cross section that does not include electrical contacts 210. In various aspects that include more than one detent 133, the force gauge 100 may include electrical contacts 210 in all or in only a portion of the detents 133. In various aspects, the first lip 230a and second lip 230b may be defined at the same height from the base 120 or at different heights to thereby affect the force threshold to move the roller 150 in a given direction along the track 130, provide a backstop to the movement of the roller 150 in a given direction, provide additional rigidity to the shell 140, etc.

In FIG. 2C, the cup 220 is defined as a hemispherical cutout in the track 130 with a continuous lip 230 running around the perimeter of the cup. In some aspects, a demi-spherical cutout corresponding to less than half of a sphere may be used for the cross-sectional shape of a cup 220 adapted for use with a spherical roller 150. Although illustrated at a constant distance relative to the cap 141, in some aspects, the lip 230 may vary in height around the perimeter of the cup 220 to thereby affect the force threshold to move the roller 150 in a given direction along the track 130, provide a backstop to the movement of the roller 150, provide additional rigidity to the shell 140, etc.

Figure 3A:
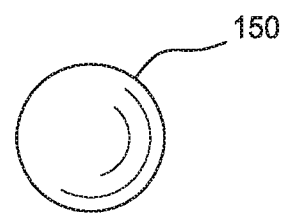
FIGS. 3A and 3B illustrate rollers as may be used in various force gauges, according to aspects of the present disclosure.
Figure 3B:
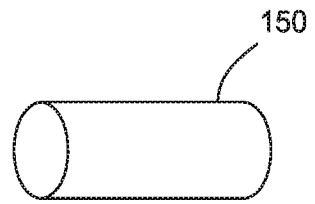

FIGS. 3A and 3B illustrate rollers 150 as may be used in various force gauges 100. The example roller 150 illustrated in FIG. 3A is a sphere (e.g., a ball bearing) with a radius r of a given size (and a corresponding diameter of 2r). The example roller 150 illustrated in FIG. 3B is a cylinder (e.g., a bar) with a radius r of a given size. In various aspects, roller 150 or a surface of the roller 150 is electrically conductive, to close a circuit across a pair of electrical contacts 210 that the roller 150 is in contact with. Although spherical and cylindrical rollers 150 are illustrated as examples, a force gauge 100 may include a roller 150 having other shapes, including, but not limited to: dumbbells (e.g., connected cylinders or spheres), ovoids, irregular spheres, irregular cylinders, in which the diameter 2r is determined based on the largest portion of the roller 150.

FIGS. 4A-4J illustrate various configurations of a force gauge 100, according to various aspects of the present disclosure. Each of the configurations illustrated in FIGS. 4A-4J highlight individual layouts or features, and one of skill in the art will recognize that the layouts and features illustrated and discussed herein may be combined with one another to produce additional configurations for force gauges 100 in the spirit of the present disclosure.

Figure 4C:
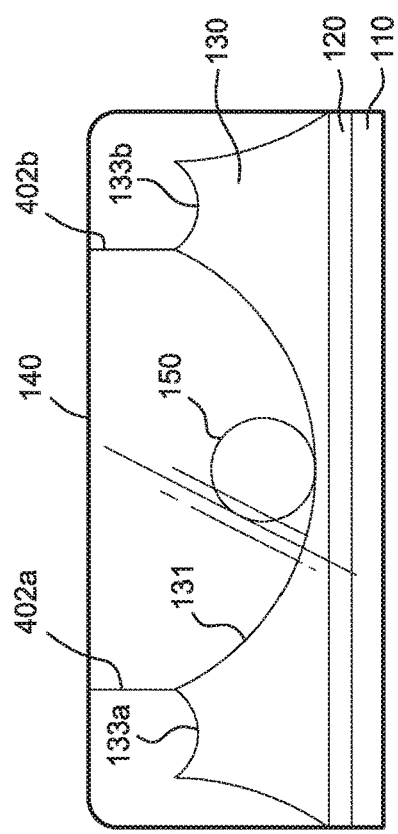
FIGS. 4A-4J illustrate various configurations of a force gauge, according to aspects of the present disclosure.
Figure 4D:
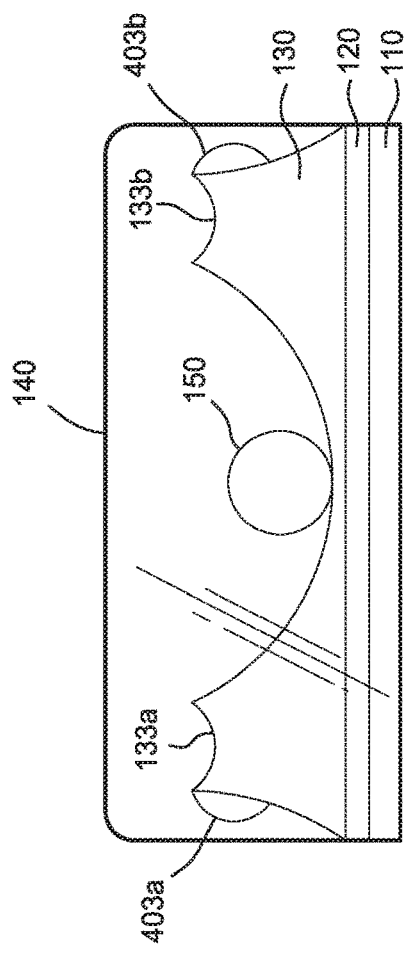
Figure 4A:
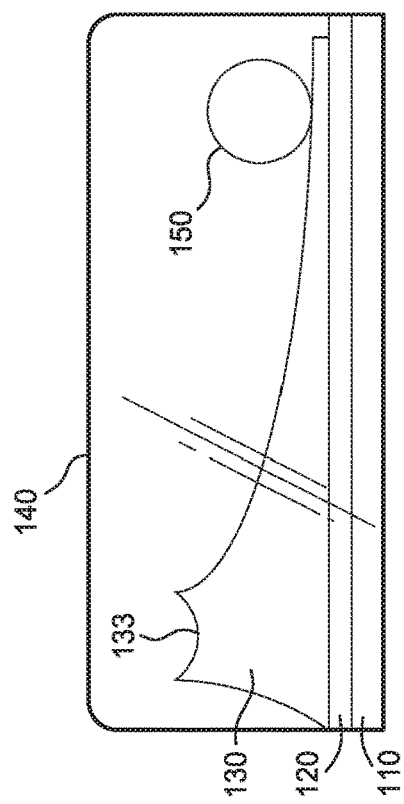

FIG. 4A illustrates a force gauge 100 that includes one roller 150 and a track 130 defining a single detent 133. Although the examples discussed in the present disclosure primarily include one or two detents 133, a force gauge 100 may include more than two detents 133 in various embodiments.

Figure 4B:
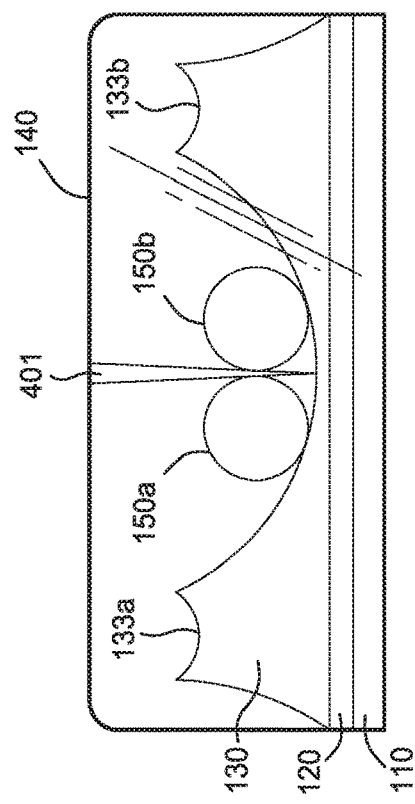

FIG. 4B illustrates a force gauge 100 that includes two rollers 150 that are located on opposite sides of the force gauge 100 relative to a divider 401. In some aspects, the divider 401 is a portion of the shell 140, a portion of the track 130, or a distinct component that separates the force gauge 100 into two distinct sides that each include one roller 150.

FIG. 4C illustrates a force gauge 100 that includes a first vertical membrane 402a (generally, vertical membrane 402) at the transition from the first detent 133a to the trough 131 and a second vertical membrane 402b at the transition from the second detent 133b to the trough 131. A vertical membrane 402 disposed between a trough 131 and a detent 133 provides a tamper resistant visual indication of whether the distance d between the shell 140 and the track 130 has exceeded the force threshold. A first end of each vertical membrane 402 is attached to the shell 140 and a second end is attached to the track 130. The length of the vertical membrane 402 and the material that the vertical membrane 402 is made of are configured so that the vertical membrane 402 permanently separates when the distance d exceeds the diameter 2r of the roller 150. In various aspects, the vertical membrane 402 separates by detaching from the shell 140, detaching from the track 130, or ripping/tearing, and thereby allowing the roller 150 to move between the detent 133 and the trough 131.

FIG. 4D illustrates a force gauge 100 that that includes a first magnet 403a (generally, magnet 403) at the first detent 133a and a second magnet 403b at the second detent 133b. When the roller 150 is made from or includes a ferromagnetic material, a magnet disposed in a detent 133 (or the trough 131) may be provided to help seat the roller 150 or retain the roller 150 once seated.

Figure 4G:
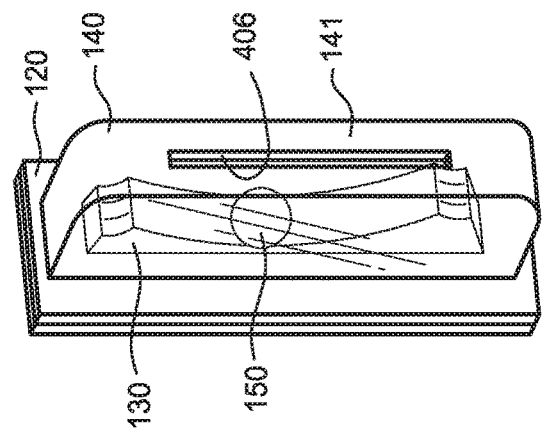
Figure 4E:
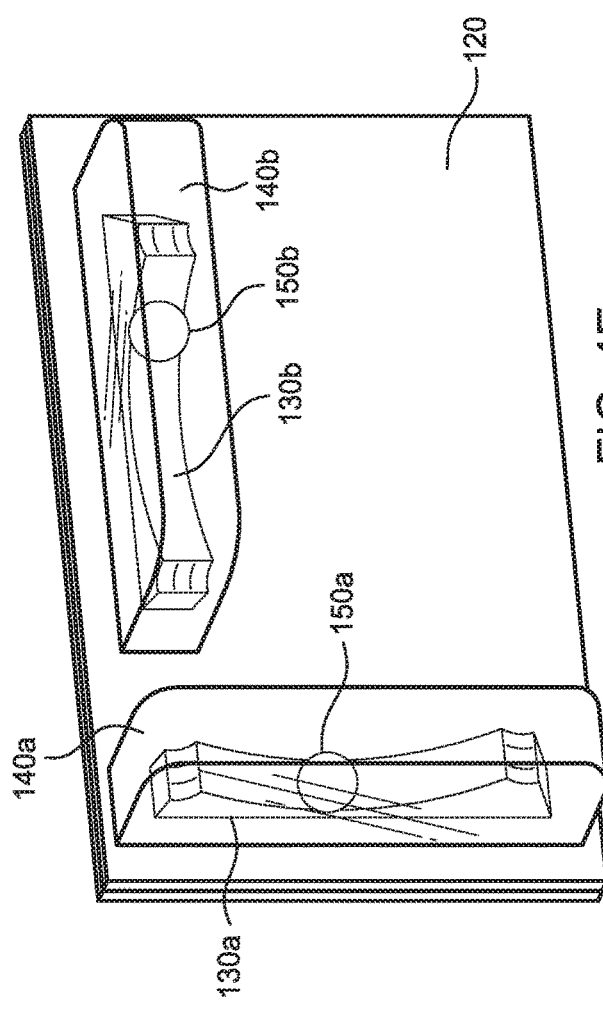

FIG. 4E illustrates a force gauge 100 that includes a first shell 140a and a first track 130a (with a first roller 150a) aligned on a first axis, and a second shell 140b and a second track 130b (with a second roller 150b) aligned on a second axis perpendicular to the first axis. In various aspects, each set of shells 140, tracks 130, and rollers 150 are associated with individual RFID antennas 121, or each of the shells 140, tracks 130, and rollers 150 may use a shared RFID antenna 121.

Figure 4H:
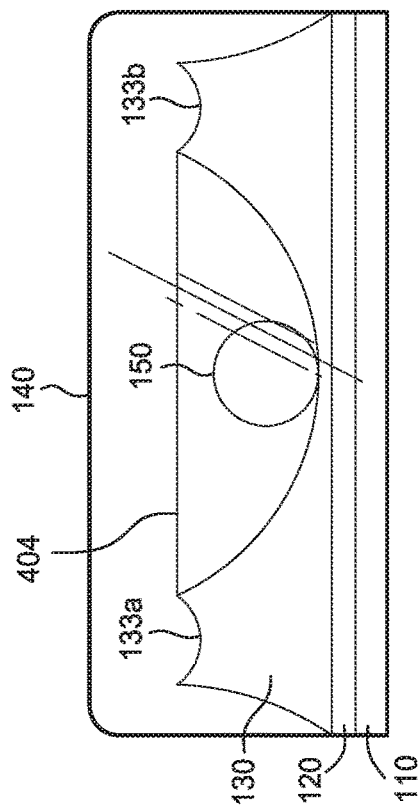
Figure 4F:
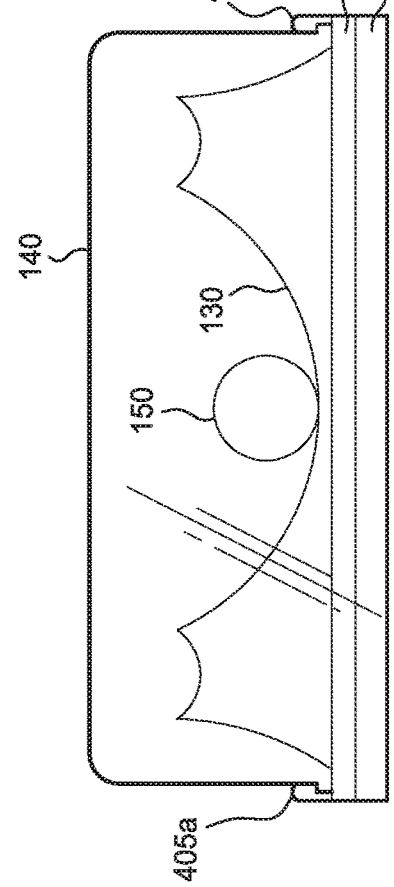

FIG. 4F illustrates a force gauge 100 that includes a selectively removable/mountable shell 140 that engages with the base 120 via a first tab 405a (generally, tab 405) and a second tab 405b. In various aspects, a plurality of tabs 405 secure the flexible shell 140 to the base 120 such that a user can selectively remove (and later reattach) the shell 140 to the base 120, for example, to reset the roller 150 to an initial position from an impacted position when using a multi-use force gauge 100.

FIG. 4G illustrates a force gauge 100 that includes a shell 140 with a channel 406 defined in the cap 141 of the shell 140. In other aspects, the channel 406 is defined in one or more of the perimeter walls 142 of the shell 140. The channel 406 defines a through-hole in the shell 140 aligned on the long axis of the force gauge 100. The channel 406 allows a user to insert a tool into the shell 140 and reposition the roller 150, for example to reset the roller 150 to an initial position from an impacted position when using a multi-use force gauge 100.

FIG. 4H illustrates a force gauge 100 that includes a horizontal membrane 404 that is connected to the first detent 133a at a first end and to the second detent 133b at a second end. A horizontal membrane 404 disposed between a pair of detents 133 provides a tamper resistant visual indication of whether the distance d between the detents has been increased beyond the separation point of the horizontal membrane in response to an impact force exceeding the force threshold. The length of the horizontal membrane 404 and the material that the horizontal membrane 404 is made of are configured so that the horizontal membrane 404 permanently separates when the force gauge 100 experiences an impact that exceeds the force threshold. In various aspects, the horizontal membrane 404 separates by detaching from the first detent 133a, detaching from the second detent 133b, or ripping/tearing, and thereby allowing the roller 150 to move between the detent 133 and the trough 131.

Figure 4I:
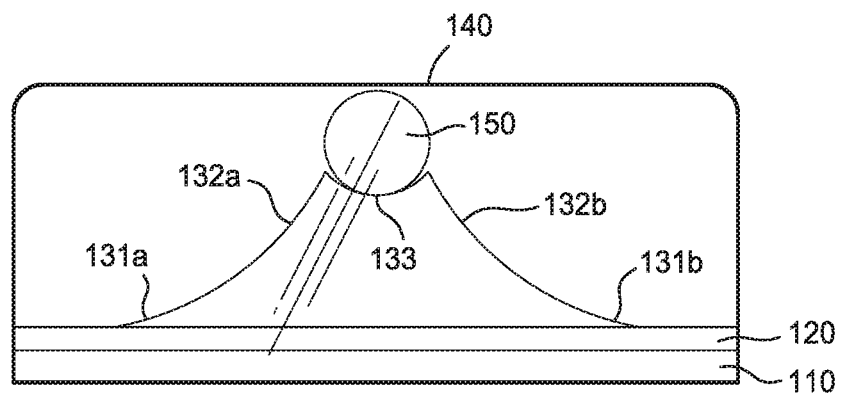

FIG. 4I illustrates a force gauge 100 that includes one detent 133, a first trough 131a, and a second trough 131b located on opposite sides of the one detent 133. In various aspects, by placing the detent 133 between two troughs 131 and initially positioning the roller 150 in the detent 133, a user may determine a direction of an impact force based on whether the roller 150 is located in the first trough 131a or the second trough 131b.

Figure 4J:
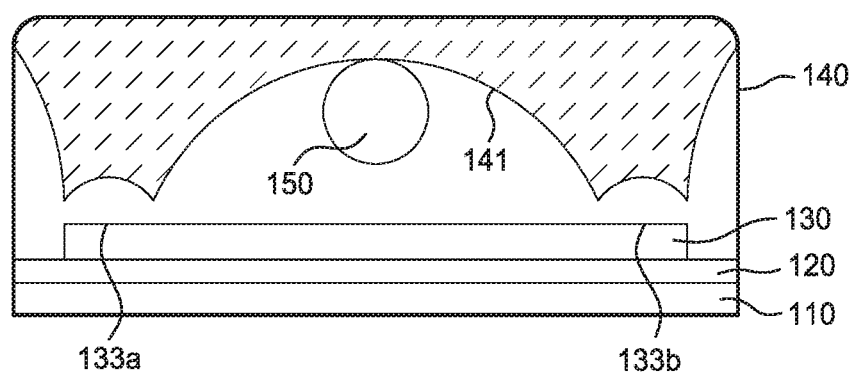

FIG. 4J illustrates a force gauge 100 that includes a track 130 of a constant height relative to the base 120, and a cap 141 with a variable height relative to the base 120 along the axis of force measurement. In various aspects, the track 130 may vary in height along an axis perpendicular to the axis of force measurement (e.g., defining a half- or demi-pipe for the roller 150). The variable height of the cap 141 defines portions of the track 130 that correspond to the detents 133 and troughs 131 discussed elsewhere in the present disclosure. In various aspects, a cap 141 of variable height may also be used in conjunction with a track of variable height.

Figure 5:
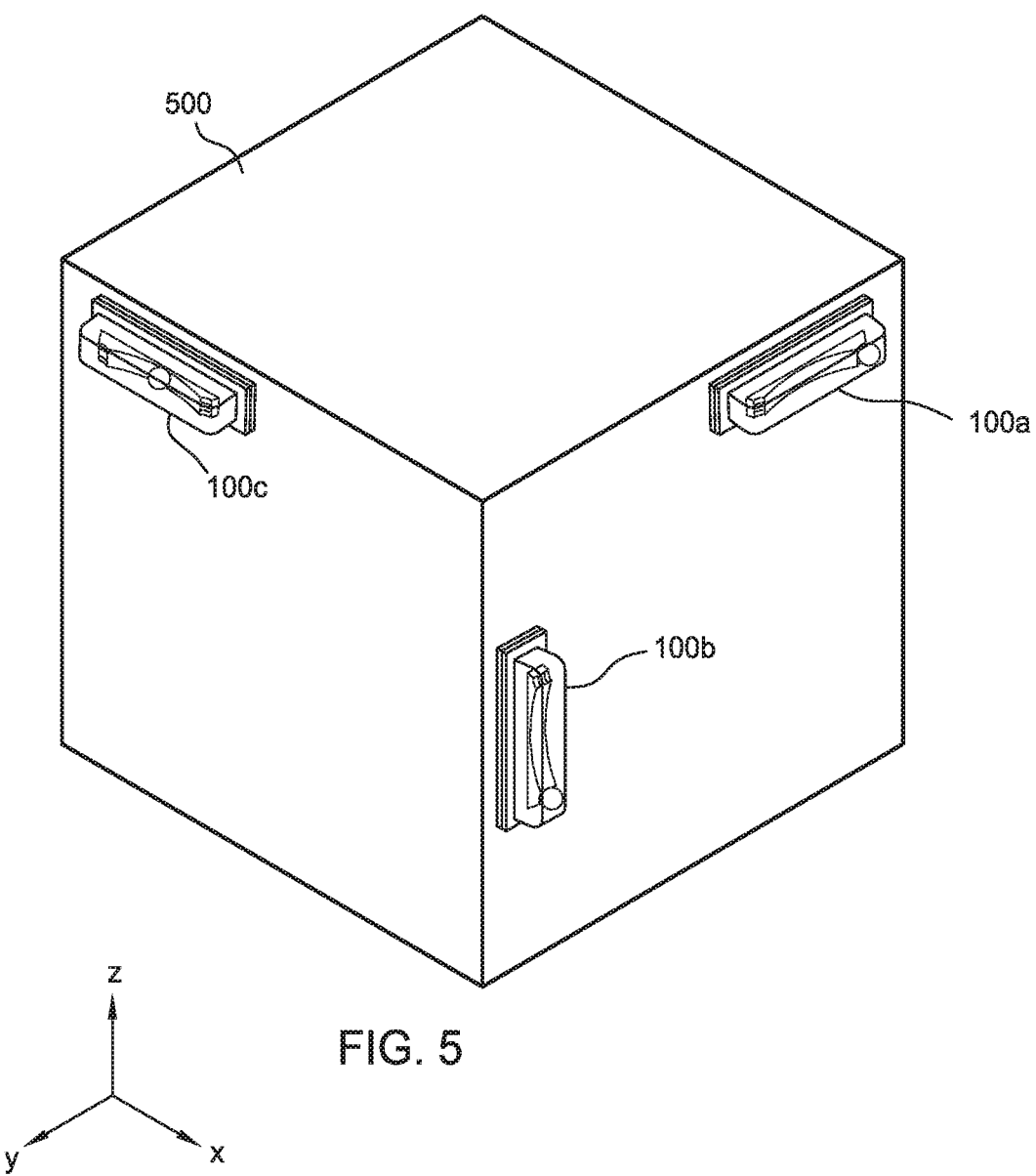
FIG. 5 illustrates a potential application of force gauges to an object, according to aspects of the present disclosure.

FIG. 5 illustrates a potential application of force gauges 100 to an object 500. Three force gauges 100a-c are illustrated at different locations and orientations on an object 500 illustrated as a box. Each of the illustrated force gauges 100a-c in FIG. 5 are aligned along an axis of the object 500 to detect forces acting along those axes; the length of the first force gauge 100a is aligned to the y-axis of the object 500 and detects forces acting along the y-axis, the length of the second force gauge 100b is aligned to the z-axis of the object 500 and detects forces acting along the z-axis, and the length of the third force gauge 100c is aligned to the x-axis of the object 500 and detects forces acting along the x-axis.

It will be appreciated that more or fewer than three force gauges 100 may be mounted on objects of other sizes, shapes, and compositions in other aspects. For example, an object 500 may include two or more force gauges 100 aligned along the same axis, but located at different locations on the object 500, to monitor for different force thresholds or to differentiate the impact force at different locations of the object.

Figure 6:
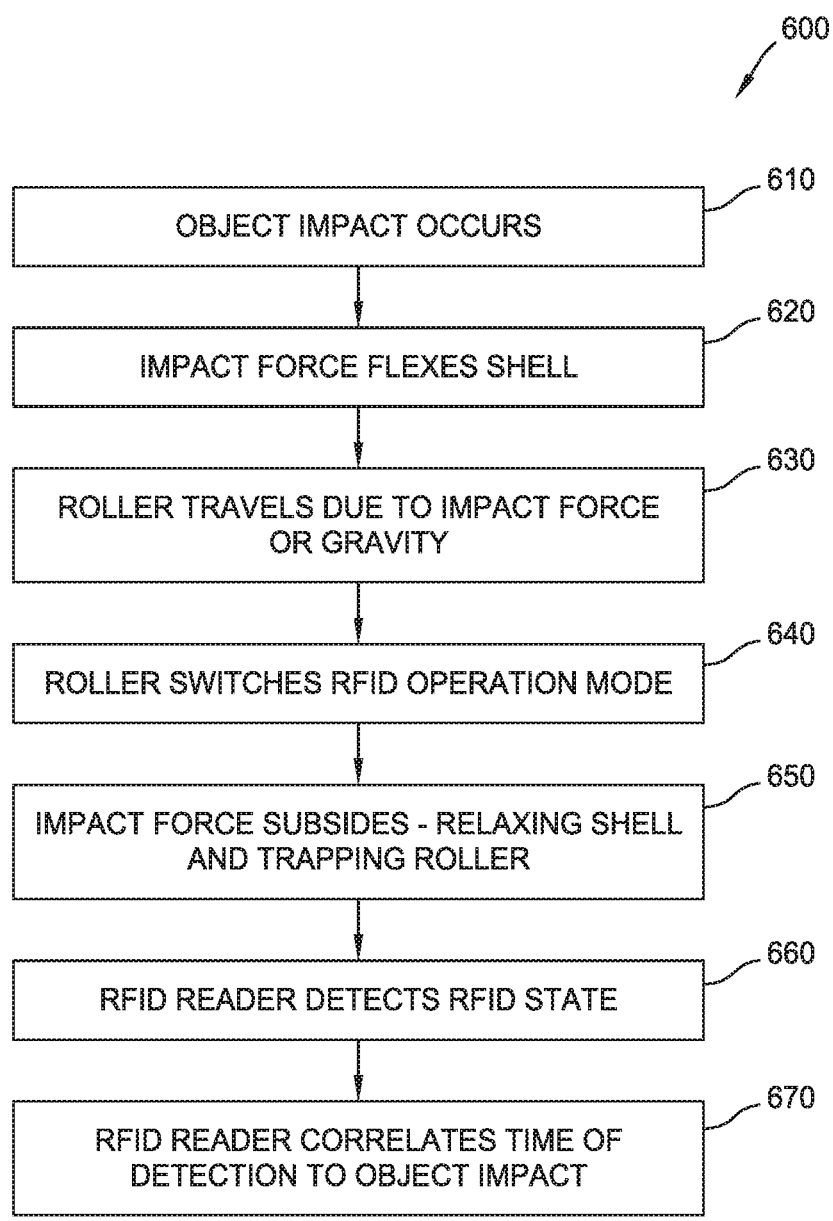
FIG. 6 is a flowchart of a method for using a force gauge, according to aspects of the present disclosure.

FIG. 6 is a flowchart of a method 600 for using a force gauge 100. Method 600 begins at block 610, where an impact to an object 500 that a force gauge 100 is mounted to occurs. The force of the impact causes, at block 620, the shell 140 of the force gauge 100 to flex in a plane perpendicular to the direction of the force of the impact. For example, when an object 500 is dropped on the z-axis (e.g., where a face in an xy-plane hits the floor), the impact force travels along the z-axis, and a force gauge 100 aligned along the z-axis flexes in the xy-plane in response. When the force of the impact exceeds a force threshold, the distance d in a bottleneck between the shell 140 and the track 130 is expanded to exceed the diameter 2r of the roller, and method 600 proceeds to block 630. Otherwise, when the force of the impact does not exceed a force threshold, method 600 may conclude.

At block 630, the roller 150 travels from an initial position to a new position in the force gauge 100 in response to the impact force. In some aspects, the roller 150 travels from an initial position to the new position due to inertia in the roller 150 and the lower amount of force transferred from the impact to the roller 150 relative to the track 130 and shell 140, the force changes the relative location of the roller 150 to the track 130. Stated differently, the impact moves the track 130 more than the roller 150, which causes the roller 150 to translate in location relative to the track 130 to a greater degree than the roller translates in space, causing a relative relocation of the roller 150 opposite to the direction of the impact force vector. In other aspects, the impacts causes the roller 150 to move less than the track 130 moves, and the roller 150 may move within the shell 140 in a direction in-line with the direction of the impact force vector (or in another direction after rebounding off of a surface). In various aspects, the roller 150 travels from a detent 133 into a trough 131. In some aspects, the roller travels from a trough 131 into a detent 133.

At block 640, the changed position of the roller 150 switches an RFID operation mode. In aspects in which the roller 150 enters a detent 133 including a pair of electrical contacts 210 at block 630, the presence of the roller 150 establishes an electrical across the electrical contacts 210, which closes a circuit that includes the RFID antenna 121. In various aspects, a closed circuit may remain closed even if the roller 150 later leaves the detent 133 (e.g., to ensure the force gauge 100 is not tampered with) by one or more physical latches. In some aspects in which the roller 150 leaves a detent 133 that includes pair of electrical contacts 210 at block 630, the absence of the roller 150 in the detent 133 opens a circuit that includes the RFID antenna 121.

Block 640 may be understood with reference to FIGS. 7A-7C, which illustrate circuits formed in a force gauge 100 that may be opened or closed to affect the operation mode of an RFID antenna 121 via a roller 150 moving in the force gauge 100. In the circuit, a first electrical contact 210a, and a second electrical contact 210b form a switch (as terminals) with the roller 150 (as the gate). Although illustrated symbolically in FIGS. 7A and 7B as a Single Pole Single Throw (SPST) switch, in other aspects the switch may be a Multiple Pole Single Throw (MPST), a Single Pole Multiple Throw (SPMP, or multiple pole multiple throw based on the number of rollers 150 and contact pairs included in the circuit 700. For example, a force gauge 100 with two detents 133 that each include a pair of electrical contacts 210 and one roller 150 may be illustrated as having two SPST switches or one MPST switch (the single roller 150 completing having three states in the example circuit 700).

In various aspects, depending on the arrangement of the RFID antenna 121 in the circuit, the RFID antenna 121 may be in an operational state when the roller 150 closes the circuit between a pair of electrical contacts 210, or may be in an operational state until the roller 150 closes the circuit between a pair of electrical contacts 210 (i.e., a non-operational state when the roller 150 closes the circuit between a pair of electrical contacts 210). When in the operational state, an RFID antenna 121 may actively transmit an identifier signal using an internal power source (not illustrated), or may transmit an identifier signal when energized by an external RFID scanner. In contrast, when in a non-operational state, the RFID antenna 121 may be disconnected from a power source, or the circuit may deactivate or otherwise shunt power away from the RFID antenna 121 so as to not produce and transmit an identifier signal.

FIG. 7A illustrates a first circuit 701 in which the RFID antenna is in an operational state when the roller 150 completes the circuit between a pair of electrical contacts 210, but is otherwise in a non-operational state. For example, a roller 150 with a conductive body may close the first circuit 701 when the roller 150 touches the first electrical contact 210a and the second electrical contact 210b (e.g., in a first detent 133a) or the third electrical contact 210c and the fourth electrical contact 210d (e.g., in a second detent 133b). In another example, a roller 150 may close the first circuit 701 by actuating a plunger to connect paired electrical contacts 210 or otherwise placing paired electrical contacts 210 into physical contact with one another.

FIG. 7B illustrates a second circuit 702 in which the RFID antenna 121 is in an non-operational state when the roller 150 completes the circuit between a pair of electrical contacts 210, but is otherwise in an operational state. In FIG. 7B, the roller 150 completes the second circuit 702 by connecting the RFID antenna 121 to a shunt 710. In various aspects, the shunt 710 redirects power away from the RFID antenna 121, changes a length of the RFID antenna 121 (thereby preventing the antenna from transmitting in the bandwidth used by RFID scanners), or connects the antenna to a memory device including a null identifier that overrides the identifier normally associated with the force gauge 100.

FIG. 7C illustrates a third circuit 703 with multiple RFID antennas 121,b that correspond to individual pairs of electrical contacts 210. In various aspects, each detent 133 may be associated with an individual RFID antenna 121 so that when the roller 150 is present/absent in a different detents 133, different identifier signals are produced from the force gauge 100.

At block 650, the impact force that occurred at block 610 subsides, relaxing the flexed shell 140 relative to the track 130, and capturing/trapping the roller 150 in the position that the roller 150 traveled to in block 630. The force gauge 100 returns to a resting state in block 650, where the distance d of a bottleneck between the shell 140 and the track 130 is less than the diameter 2r of the roller 150.

At block 660, an RFID reader detects the state of the RFID antenna 121. The state of the RFID antenna 121 may variously indicate whether the force gauge 100 has experienced an impact above the force threshold due to the presence or the absence of an identifier signal. In some aspects, an RFID reader emits an electromagnetic field that energizes a passive RFID antenna 121 to transmit an identifier signal to indicate that the force gauge 100 has experienced an impact exceeding the force threshold. In other aspects, an RFID reader emits an electromagnetic field that energizes a passive RFID antenna 121 to transmit an identifier signal to indicate that the force gauge 100 has not experienced an impact exceeding the force threshold. In yet other aspects, an RFID reader receives an identifier signal from an active RFID antenna 121 transmitting identifier signals when the force gauge 100 has not experienced an impact exceeding the force threshold. In further aspects, an RFID reader may treat the lack of an expected identifier signal or an interruption in the transmission of the identifier signal from a force gauge 100 to indicate that the force gauge 100 has not experienced an impact exceeding the force threshold.

At block 670, the RFID reader correlates the determination of whether the force gauge 100 has experienced an impact exceeding the force threshold (as per block 660) to the object impact (occurring per block 610). In various aspects, the RFID reader associates at least one of a timestamp and a location at which the determination per block 660 was made with the determination. For example, and RFID reader in a factory setting may indicate the location in the factory where an impact is detected for a given force gauge 100 and when the determination was made so that a process engineer can perform a root cause analysis on a potential impact event. Method 600 may then conclude.

FIGS. 8A-8E illustrate the operation of internal electrical contacts 210. In some aspects, the electrical contacts 210 are disposed on an exposed surface of the detent 133, while in other aspects, the electrical contacts 210 are internal to the detent 133, and are actuated by the roller 150 via a plunger 810 exposed in the detent. When using exposed electrical contacts 210, the body of the roller 150 is conductive and closes a circuit across the electrical contacts 210 when present in the detent 133. When using internal electrical contacts 210, the body of the roller 150 may be non-conductive or conductive, as the plunger 810 includes a conductive bridge 820 that the roller 150 pushes into contact between the internal electrical contacts 210. The conductive bridge 820 includes a conductive pathway that completes a circuit between the pair of internal electrical contacts 210 when held in contact with the electrical contacts 210.

FIG. 8A illustrates a cross-sectional view of a plunger 810 for internal contacts 210 in a first state, in which the roller 150 is not present in the detent 133 and the plunger 810 extends upward from the cup 220 towards the cap 141 of the shell 140. The plunger 810 is disposed in the detent 133 to move to different distances relative to the cap 141 of the shell 140, and a spring 830 holds the electrical bridge 820 out of contact with the electrical contacts 210a and 210b internal to the track 130 when the roller 150 is absent.

FIG. 8B illustrates a cross-sectional view of a plunger 810 for internal contacts 210 in a second state, in which the roller 150 is present in the detent 133 and pushes the electrical bridge 820 into contact with the electrical contacts 210a and 210b against the spring 830. In various aspects, the weight of the roller 150 and/or the force exerted by the cap 141 on the roller 150 overcomes the force of the spring 830.

In some aspects, when the roller 150 is removed from the detent 133, the plunger 810 returns to the first state (per FIG. 8A) from the second state, and the spring 830 moves the electrical bridge 820 out of contact between the internal electrical contacts 210 (i.e., opening the circuit 700).

In some aspects, such as is illustrated in FIG. 8C, when the roller 150 is removed from the detent 133, the plunger 810 remains in the second state (per FIGS. 8B and 8C), and the electrical bridge 820 remains in contact between the internal electrical contacts 210 (i.e., keeping the circuit 700 closed).

FIGS. 8D and 8E illustrate one example of a catch 840 interacting with the electrical bridge 820 to retain the electrical bridge 820 in contact with the internal electrical contacts 210 regardless of whether the roller 150 remains in the detent 133 (per FIGS. 8B and 8C). The catch 840 includes a first member 841 that is aligned in the axis of travel for the plunger 810 and a tooth 842 with a catch surface 843 perpendicular to the axis of travel for the plunger 810. Although one catch 840 is illustrated in FIGS. 8D and 8E, in other aspects, more than one catch 840 may be used. For example, the first and second electrical contacts 201a,b may be included on the catch surfaces 843 of two corresponding catches 840, or the catch 840 may be a separate mechanism than the electrical contacts 210.

When the electrical bridge 820 is located above the tooth 842, as in FIG. 8E, the plunger 810 is in the first state, and the connection between the electrical contacts 210 is open/not completed. When the roller 150 pushes the plunger 810 into the track 130 (e.g., the plunger 810 moves from the first state to the second state), the plunger 810 pushes conductive bridge 820 below the catch surface 843 of the tooth 842 and engages the conductive bridge 820 with the electrical contacts 210 to close/complete a circuit between the electrical contacts 210. When the roller 150 is absent from the detent 133, the spring 830 pushes the conductive bridge 820 upward, but the catch surface 843 of the catch 840 prevents the plunger 810 from returning to the first state, and maintains the electrical connection between the pair of electrical contacts 210 via the conductive bridge 820.

In various aspects, the force gauge 100 is a single-use gauge, and once the catch 840 has engaged with the conductive bridge 820, the plunger 810 remains in the second state (e.g., as a tamper-resistant feature). In other aspects, an external release is provided for an operator to manually release the catch 840 so that the spring 830 can return the plunger 810 to the first state and the force gauge 100 can be reset and reused.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An impact force gauge, comprising:
    a base, including a Radio Frequency Identifier (RFID) antenna;
    a roller, having a diameter and an electrically conductive surface;
    a track mounted to the base along an axis, the track including:
        a first detent located at a first height from the base, the first detent including a first pair of electrical contacts configured to close a first circuit that includes the RFID antenna across the electrically conductive surface of the roller when the roller is captured in the first detent;
        a second detent located at a second height from the base, the second detent including a second pair of electrical contacts configured to close a second circuit that includes the RFID antenna across the electrically conductive surface of the roller when the roller is captured in the second detent; and
        a trough connected to the first detent via a first ramp and to the second detent via a second ramp, wherein the trough runs from the first height to a third height and from the third height to the second height between the first detent and the second detent, wherein the third height is less than the first height and the second height; and
    a shell flexibly mounted to the base around the track and configured to capture the roller along the track, the shell including a cap that runs along the track in a plane parallel to the base, wherein the cap is located at a first vertical distance from the first detent and a second vertical distance from the second detent, wherein the first vertical distance and the second vertical distance are less than the diameter while the base is subjected to forces along the axis less than a predefined force threshold and are greater than the diameter while the base is subject to forces along the axis greater than the predefined force threshold.

2. The impact force gauge of claim 1, wherein the RFID antenna is configured to transmit an identifier, when an RFID scanner is present, when one of the first circuit and the second circuit is closed and to not transmit the identifier when the first circuit and the second circuit are open.

3. The impact force gauge of claim 1, wherein the RFID antenna is configured to transmit an identifier, when an RFID scanner is present, when the first circuit and the second circuit are open and to not transmit the identifier when one of the first circuit and the second circuit are closed, wherein the first circuit and the second circuit connect the RFID antenna to a shunt circuit when closed.

4. The impact force gauge of claim 1, wherein the roller is selected from one of:
    a spherical roller;
    a cylindrical roller; and
    an ovoid roller.

5. The impact force gauge of claim 1, wherein the first height is greater than the second height, such that forces of a magnitude less than the predefined force threshold are sufficient to set the second vertical distance to be greater that the diameter and are insufficient to set the first vertical distance to be greater than the diameter.

6. The impact force gauge of claim 1, further comprising:
    an adhesive layer mounted to a second surface of the base, opposite to a first surface to which the track is mounted, configured to mount the base to a surface of an object such that the base deforms in response to deformations of the surface of the object.

7. An impact force gauge, comprising:
    a roller;
    a track including:

a trough arranged along an axis of the track; and
a detent at a first end of the track and elevated relative to the trough; and
a flexible shell configured to retain the roller on the track when the flexible shell is in an undeformed, first state,
wherein, in response to a force applied along the axis exceeding a threshold force, the flexible shell is deformed into a second state in which a relative distance between the shell and the track increases to be greater than a diameter of the roller.

8. The impact force gauge of claim 7, wherein the shell and the track are mounted to a base that includes a circuit including a Radio Frequency Identifier (RFID) antenna, wherein the detent includes a pair of electrical contacts forming terminals in the circuit, and wherein the roller is configured to complete the circuit across the terminals when retained in the detent.

9. The impact force gauge of claim 7, wherein the detent includes a cup configured to the diameter of the roller, wherein a lip of the cup separates the detent from the trough and a distance between the lip and a cap of the shell defines the relative distance between the shell and the track.

10. The impact force gauge of claim 9, further comprising:
a vertical membrane including a first end connected to the lip and including a second end connected to the shell, wherein the vertical membrane is configured to separate when the relative distance is greater than the diameter.

11. The impact force gauge of claim 9, wherein the track further includes:
a second detent elevated at a second end of the track opposite to the first end, wherein the second detent includes a second cup configured to the diameter of the roller, wherein a second lip of the second cup separates the second detent from the trough, wherein, in response to a second force applied along the axis exceeding a second threshold force different from the threshold force, a second distance between the cap and the second lip increases to be greater than the diameter of the roller.

12. The impact force gauge of claim 11, further comprising:
a second roller; and
a divider defining a first side of the track including the detent and a second side of the track including the second detent, wherein the divider confines the roller to the first side and the second roller to the second side.

13. The impact force gauge of claim 11, further comprising:
a horizontal membrane including a first end connected to the lip and including a second end connected to the second lip, wherein the horizontal membrane is configured to separate when the relative distance is greater than the diameter.

14. The impact force gauge of claim 11, wherein the detent is electrically connected with a first Radio Frequency Identifier (RFID) antenna and the second detent is electrically connected with a second RFID antenna, wherein the roller toggles transmission states for the first RFID antenna when captured in the detent and the second roller toggles transmission states for the second RFID antenna when captured in the second detent.

15. The impact force gauge of claim 7, wherein the roller is ferromagnetic, and wherein the detent includes a magnet configured to retain the roller in the detent.

16. The impact force gauge of claim 7, further comprising:
a second roller;
a second track aligned on a second axis, different than the axis, the second track including:
a second trough arranged along the second axis; and
a second detent elevated at a first end of the second track; and
a second flexible shell configured to retain the second roller on the second track,
wherein, in response to a second force applied along the second axis exceeding a second threshold force, a second relative distance between the second shell and the second track increases to be greater than a second diameter of the second roller.

17. The impact force gauge of claim 7, wherein the shell is configured to selectively mount and dismount from a base via a plurality of tabs defined around the track.

18. The impact force gauge of claim 7, wherein a channel aligned on the axis is defined through a cap of the shell.

19. An impact force gauge, comprising:
a shell, configured to flex from a first state to a second state when a force exceeding a predetermined threshold is applied along a given axis and configured to return to the first state when the force falls below the predetermined threshold along the given axis;
a track surrounded by the shell and running on the given axis, the track including:
a first portion located a first distance from the shell; and
a second portion located a second distance, different from the first distance, from the shell; and
a roller located between the track and the shell,
wherein, in the first state, the first distance is not greater than a diameter of the roller; and
wherein, in the second state, the first distance is greater than the diameter of the roller.

20. The impact force gauge of claim 19, wherein the track further includes:
a third portion including a pair of electrical contacts, located on an opposite side of the first portion to the second portion, and located a third distance from the shell that is less than the second distance,
wherein, when the roller is located in the third portion, the roller completes a circuit for a Radio Frequency Identifier (RFID) antenna across the pair of electrical contacts.

* * * * *